(12) United States Patent
Terao

(10) Patent No.: US 10,868,794 B2
(45) Date of Patent: Dec. 15, 2020

(54) IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Yoshihide Terao, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 15/710,713

(22) Filed: Sep. 20, 2017

(65) Prior Publication Data
US 2018/0091470 A1 Mar. 29, 2018

(30) Foreign Application Priority Data
Sep. 23, 2016 (JP) .................. 2016-186140

(51) Int. Cl.
*H04L 29/12* (2006.01)
*H04L 12/24* (2006.01)
*H04N 1/32* (2006.01)

(52) U.S. Cl.
CPC ...... *H04L 61/1541* (2013.01); *H04L 41/0893* (2013.01); *H04L 61/1552* (2013.01); *H04L 61/1594* (2013.01); *H04N 1/32106* (2013.01); *H04L 41/12* (2013.01); *H04N 2201/3204* (2013.01); *H04N 2201/3274* (2013.01)

(58) Field of Classification Search
CPC ............. H04L 61/1541; H04L 41/0893; H04L 61/1552; H04L 61/1594; H04N 1/32106
See application file for complete search history.

(56) References Cited

U.S. PATENT DOCUMENTS

| 2002/0194196 A1* | 12/2002 | Weinberg | G06F 16/258 |
| 2003/0236868 A1* | 12/2003 | Naitou | H04L 61/15 709/220 |
| 2005/0097171 A1* | 5/2005 | Hikichi | H04L 63/0407 709/204 |
| 2009/0070451 A1* | 3/2009 | Sakiyama | H04N 1/00244 709/223 |
| 2012/0150955 A1* | 6/2012 | Tseng | H04L 51/22 709/204 |

(Continued)

FOREIGN PATENT DOCUMENTS

| CN | 1933402 A | 3/2007 |
| CN | 105262920 A | 1/2016 |

(Continued)

*Primary Examiner* — Clayton R Williams
*Assistant Examiner* — Christopher B Robinson
(74) *Attorney, Agent, or Firm* — Canon U.S.A., Inc. IP Division

(57) ABSTRACT

In a case where the name of the address book to be imported is a default name, the name of a stored address book is set as the name of the address book to be imported. A control method for an image processing apparatus includes storing, in a storage, an address book, importing an address book from an external apparatus, determining whether a name of an address book imported by the importing is a default name or not, and in a case where the name of the address book imported by the importing is a default name, setting a name of an address book stored in the storage as the name of the address book to be imported by the importing.

7 Claims, 16 Drawing Sheets

(56) References Cited

U.S. PATENT DOCUMENTS

| | | | |
|---|---|---|---|
| 2013/0151559 A1* | 6/2013 | Winslow | G07B 17/00508 |
| | | | 707/770 |
| 2013/0201514 A1 | 8/2013 | Terao | |
| 2013/0218875 A1* | 8/2013 | Carriri | G06F 16/25 |
| | | | 707/722 |
| 2014/0298417 A1 | 10/2014 | Kawashima | |
| 2015/0229795 A1* | 8/2015 | Wang | H04N 1/32496 |
| | | | 358/1.13 |

FOREIGN PATENT DOCUMENTS

| | | |
|---|---|---|
| EP | 1763216 A2 | 3/2007 |
| JP | 2001358864 A | 12/2001 |
| JP | 2006033459 A | 2/2006 |
| JP | 2011-034464 A | 2/2011 |
| JP | 2012-239034 A | 12/2012 |
| JP | 2013-162494 A | 8/2013 |
| JP | 2016019148 A | 2/2016 |

\* cited by examiner

FIG. 5A

| DESTINATION TABLE ID (501) | NAME OF DESTINATION TABLE (502) | DESTINATION DATA (503) |
|---|---|---|
| 1 | DESTINATION TABLE 1 | DESTINATION 1, DESTINATION 2, DESTINATION 3 |
| 2 | DESTINATION TABLE 2 | DESTINATION 4, DESTINATION 5 |
| ⋮ | ⋮ | ⋮ |
| 10 | DESTINATION TABLE 10 | DESTINATION 99, DESTINATION 100 |

FIG. 5B

| GROUP DESTINATION TABLE ID (504) | NAME OF GROUP DESTINATION TABLE 1 (505) | AFFILIATION GROUP (506) | DESTINATION DATA (507) |
|---|---|---|---|
| 1 | GROUP DESTINATION TABLE 1 | GroupA, GroupB, GroupC | DESTINATION A, DESTINATION B |
| 2 | SYSTEM FIRST DESIGN DIVISION | GroupB, GroupD | DESTINATION C, DESTINATION D |
| ⋮ | ⋮ | ⋮ | ⋮ |
| N | GROUP DESTINATION TABLE N | GroupA, GroupN | DESTINATION X, DESTINATION Y, DESTINATION Z |

FIG. 5C

| PERSONAL DESTINATION TABLE ID (508) | NAME OF PERSONAL DESTINATION TABLE (509) | AFFILIATION USER (510) | DESTINATION DATA (511) |
|---|---|---|---|
| 1 | PERSONAL DESTINATION TABLE | UserA | DESTINATION A1, DESTINATION A2 |
| 2 | PERSONAL DESTINATION TABLE | UserB | DESTINATION A4, DESTINATION A5 |
| ⋮ | ⋮ | ⋮ | ⋮ |
| N | PERSONAL DESTINATION TABLE | UserN | DESTINATION A9, DESTINATION A10 |

FIG. 5D

| NAME OF DESTINATION | GROUP SMB |
|---|---|
| HOST NAME | 172.24.1.1 |
| FOLDER PATH NAME | \\smb\path |
| USER NAME | userA |
| PASSWORD | ***** |

FIG. 6

| GROUP ID | USER GROUP | AFFILIATION USER |
|---|---|---|
| 1 | GroupA | UserA, UserB, UserC |
| 2 | GroupB | UserB, UserD |
| ⋮ | ⋮ | ⋮ |
| N | GroupN | UserA, UserN |

FIG. 8A

```
AddressBook ID:1
AddressBook Name:DESTINATION TABLE 1
{
<
cn:SMB SERVER 1
url:\\172.24.1.1
path:\\smb1\path
username:userA
pwd::NuXg0qaofeWEqsoBkrpGafz64W0gt1tXq7oSKsB7al3WL6e/
protocol:Smb
>
<
cn:SHARED FTP SERVER
url:172.24.1.1
path:ftp/path
username:userB
pwd::tXq7oSKsB7al3WL6eNuXg0rpGafz64W0gt1qaofeWEqsoBk/
protocol:FTP
>
<
cn:SMB SERVER 2
url:\\172.24.10.1
path:\\smb\path
username:userC
pwd::rpGafz64W0gt1Xq7oS6eNuXg0KsB7al3WLqaofeWEqsoBk/
protocol:SMB
>
}
```

DESTINATION 1 — cn:SMB SERVER 1 block
DESTINATION 2 — cn:SHARED FTP SERVER block
DESTINATION 3 — cn:SMB SERVER 2 block

FIG. 8B

```
GroupAddressBook ID:2
GroupAddressBook Name:SYSTEM FIRST DESIGN DIVISION
{
<
cn:11 DESIGN DIVISION SMB
url:\\192.24.2.1
path:\\smb\share
username:userz
pwd::B7al3WrpGaSKsfz64WqaofeWE0gt1tXq7oL6eNuXg0qsoBk/
protocol:Smb
>
<
cn:11 DESIGN DIVISION FTP
url:192.24.3.1
path:\\ftp\share
username:userz
pwd::B7al3WrpGaSKsfz64WqaofeWE0gt1tXq7oL6eNuXg0qsoBk/
protocol:FTP
>
}
```

DESTINATION C: cn:11 DESIGN DIVISION SMB block

DESTINATION D: cn:11 DESIGN DIVISION FTP block

| IMPORT BY DELETE AND OVERWRITE | IMPORT TO: AddressBook ID: 2 | DESTINATION TABLE DATA |

FIG. 11

| GROUP DESTINATION TABLE ID (504) | NAME OF GROUP DESTINATION TABLE (505) | AFFILIATION GROUP (506) | DESTINATION DATA (507) |
|---|---|---|---|
| 1 | GROUP DESTINATION TABLE 1 | GroupA, GroupB, GroupC | DESTINATION A, DESTINATION B |
| 2 | SYSTEM FIRST DESIGN DIVISION | GroupB, GroupD | DESTINATION 1, DESTINATION 2, DESTINATION 3 |
| ⋮ | ⋮ | ⋮ | ⋮ |
| N | GROUP DESTINATION TABLE N | GroupA, GroupN | DESTINATION X, DESTINATION Y, DESTINATION Z |

FIG. 13

THE NAME OF DESTINATION TABLE IN IMPORT SOURCE IS NOT MATCHED
WITH THE NAME OF DESTINATION TABLE IN IMPORT DESTINATION.
SELECT NAME OF DESTINATION TABLE TO BE USED.

☐ NAME OF DESTINATION TABLE (DESTINATION TABLE 1) IN IMPORT
  SOURCE
■ NAME OF DESTINATION TABLE (SYSTEM FIRST DESIGN DIVISION)
  IN IMPORT DESTINATION

IMAGE PROCESSING APPARATUS, CONTROL METHOD THEREFOR, AND STORAGE MEDIUM

BACKGROUND

Field

The present disclosure relates to an image processing apparatus, a control method therefor, and a storage medium.

Description of the Related Art

An image processing apparatus such as a digital multifunction peripheral may have functions to digitize data of a scanned document and transmit it to an arbitrary transmission destination by electronic mail and to perform file transmission (SMB transmission). Destination data to be used for transmitting electronic mail or a file may be stored in an address book managed by the image processing apparatus. Japanese Patent Laid-Open No. 2001-358864 discloses classifying destination data for storage in an address book for higher efficiency in searching of destination data.

The destination data stored in such an address book may be externally extracted (or exported) from an external computer terminal through a web browser and be stored (or imported) in another image processing apparatus. Japanese Patent Laid-Open No. 2006-33459 discloses direct communication performed between image processing apparatuses without going through a computer terminal so that destination data stored in an address book in one image processing apparatus can be exported and directly imported by another image processing apparatus.

Japanese Patent Laid-Open No. 2016-19148 discloses that destination data stored in an address book which can be accessed by all users is exported from an external computer terminal through a web browser and is imported to an address book which can only be accessed by a specific user of another image processing apparatus.

However, in a case where destination data in a destination table in an address book which can be accessed by all users is exported from an external computer terminal through a web browser and is imported to an address book which can only be accessed by a specific user of another image processing apparatus as in Japanese Patent Laid-Open No. 2016-19148, the name of the imported destination table may already exist in the address book to which the destination table is imported, according to some import methods. For example, when destination table data with a default name "DESTINATION TABLE 1" in a displayed list 401 of destination tables as illustrated in FIG. 4 is imported to a group destination table 1, there are destination tables having the identical default name "DESTINATION TABLE 1".

SUMMARY

For example, in one mode (such as a delete and overwrite mode), a destination table may be imported after a destination table in an address book in an import destination is entirely deleted. In this case, if the destination table has a default name in the import source, the destination table keeps the default name in the import destination. As a result, a user may not identify the destination table by the name in the import destination.

In various embodiments of the present disclosure, an image processing apparatus includes an address book storing unit configured to store an address book, an address book importing unit configured to import an address book from an external apparatus, a determining unit configured to determine whether the address book imported by the importing unit has a default name or not, and a control unit configured to, in a case where the address book imported by the importing unit has a default name, set a name of the address book stored in the address book storing unit as the name of the address book imported by the importing unit.

Further features will become apparent from the following description of exemplary embodiments with reference to the attached drawings.

BRIEF DESCRIPTION OF THE DRAWINGS

The attached drawings illustrate embodiments of the present disclosure.

FIGS. 5A to 5D illustrate management of destination table data managed in a destination table DB, a personal destination table DB and a group destination table.

FIG. 6 illustrates an example of a management table describing which user is associated with which user group according to the first embodiment.

FIGS. 8A to 8C illustrate example data (destination table data for import) as a result of export of the destination table data illustrated in FIGS. 5A to 5D.

FIG. 11 illustrates destination table data under "SYSTEM FIRST DESIGN DIVISION" after the import processing is completed.

FIG. 13 illustrates an example confirmation window to be displayed on an operating unit in an image forming apparatus according to a third embodiment.

DESCRIPTION OF THE EMBODIMENTS

Embodiments of the present disclosure will be described in detail below with reference to the attached drawings. It is not intended that the following embodiments limit the scope of the present disclosure, and all the combinations of features according to the described embodiments are not necessary in all embodiments of the present disclosure.

First Embodiment

Figure 1:
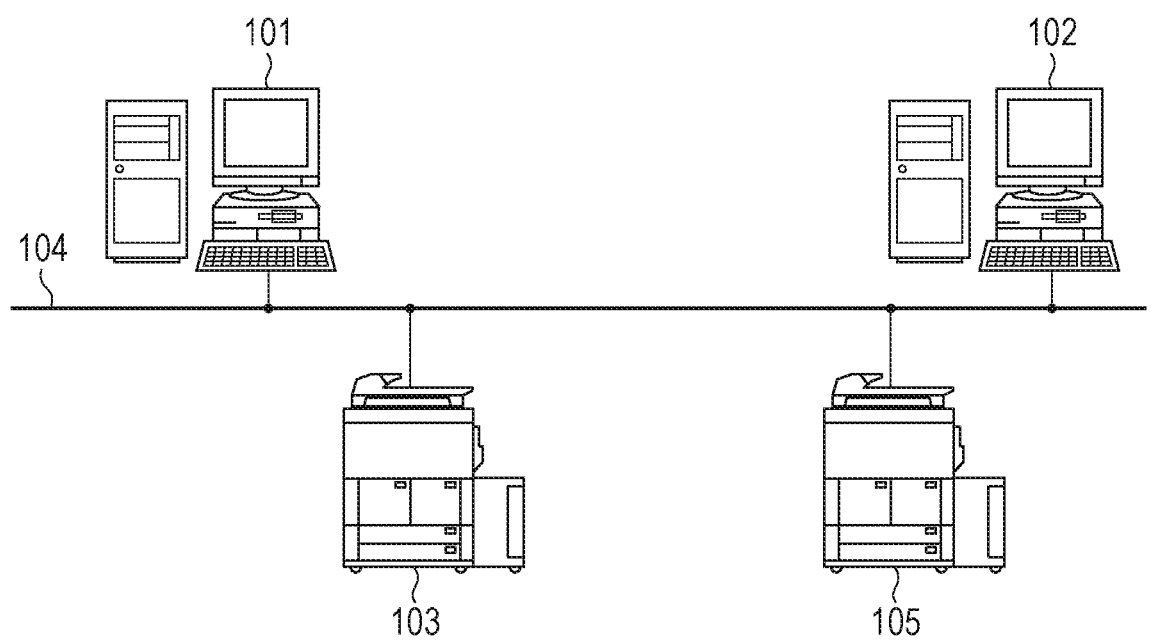
FIG. 1 illustrates a configuration of an entire system according to a first embodiment of the present invention.

FIG. 1 illustrates a configuration of an entire system according to a first embodiment of the present disclosure.

Image processing apparatuses 103 and 105 are multifunction peripherals (MFPs) which may have a scan function, a print function, a facsimile function, and a box function, for example. Each of the image processing apparatuses 103 and 105 may be configured to digitize image data scanned from a document, for example, and transmit it to a shared folder, for example, in a computer 101, which is an example of an external apparatus, over a network 104. Each of the image processing apparatuses 103 and 105 has a user authentication function, and when a user operates the image processing apparatus 103 or 105, an administrator of the apparatus can set whether the user is to be authenticated or not. User names, passwords and so on to be used for such user authentication can be managed by the image processing apparatuses 103 and 105 but may be managed by an authentication server 102 over the network 104.

The image processing apparatus 103 can export destination data, including a destination table list (which will be described with reference to FIG. 4) stored in the image processing apparatus 103, from a web browser on the computer 101 over the network 104. The destination table data (hereinafter, called destination table data for import) including the thus exported destination table list is imported to the other image processing apparatus 105 by the computer 101 over the network 104. Alternatively, the image processing apparatus 103 may be connected to the image processing apparatus 105 over the network 104 so that the destination data can be directly distributed from the image processing apparatus 103 to the image processing apparatus 105 without going through the computer 101.

The following description assumes that destination table data is imported from the image processing apparatus 103 to the computer 101 and is imported from the computer 101 to the image processing apparatus 105 but may be vice versa.

Figure 2:
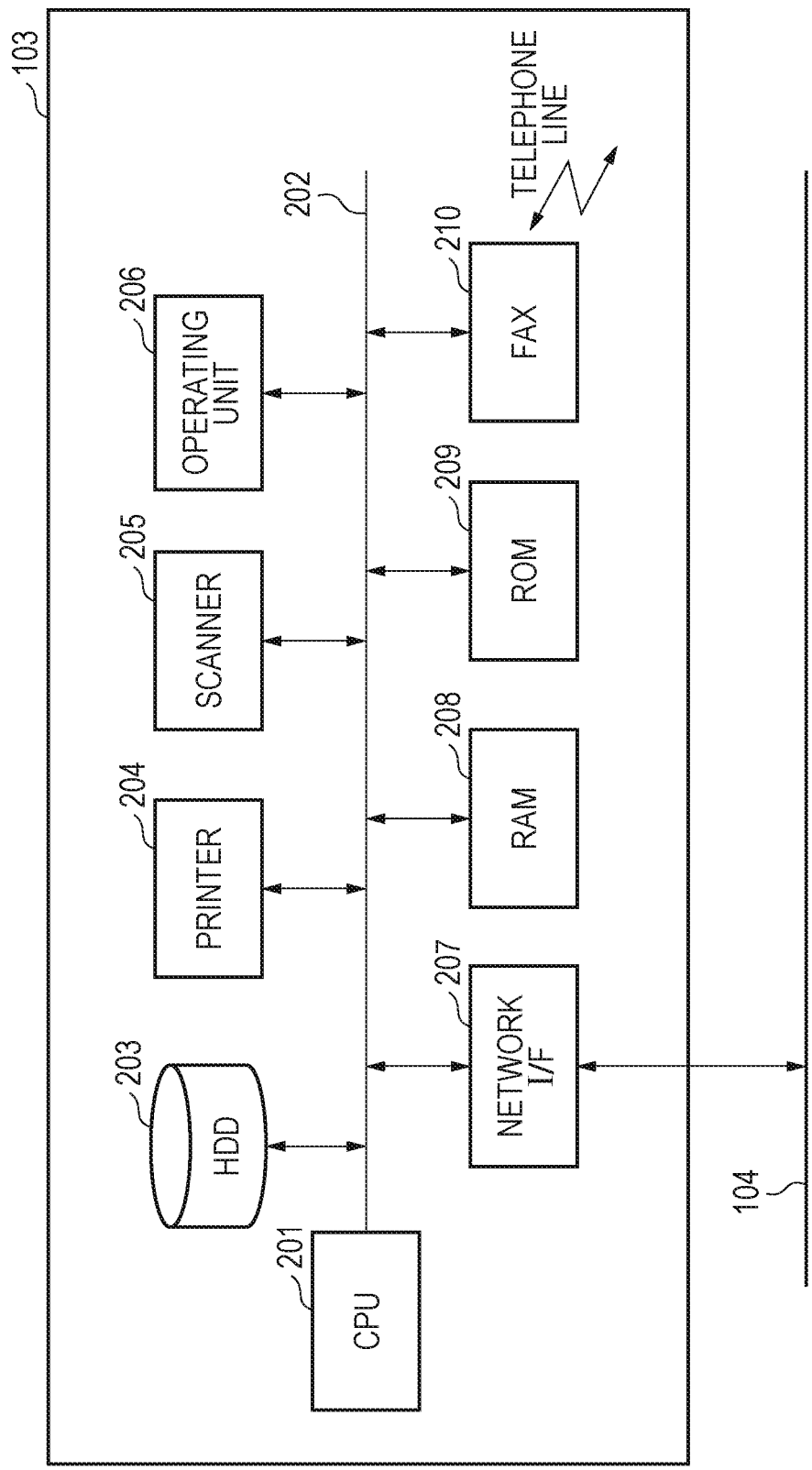
FIG. 2 is a block diagram illustrating a hardware configuration of an image processing apparatus according to the first embodiment.

FIG. 2 is a block diagram illustrating a hardware configuration of the image processing apparatus 103 according to the first embodiment. The following description is also applicable to the image processing apparatus 105.

The CPU 201 decompresses a program stored in a ROM 209 into a RAM 208 and controls operations of the entire image processing apparatus 103 by executing the decompressed program. The CPU 201 communicates with components in the image processing apparatus 103 through a bus 202. A printer 204 is configured to print on recording paper (or sheet) an image based on image data input thereto. A scanner 205 is configured to scan an image on a document placed on a platen glass by a user and store the image data acquired by the scanning in an HDD 203 or the RAM 208. The scanner 205 includes a document conveying device, not illustrated, which can sequentially convey a plurality of documents loaded in the document conveying device onto the platen glass for scanning. The HDD 203 is a hard disk drive and can save image data input from the scanner 205 and user data (such as an address book). An operating unit 206 may include a plurality of keys usable by a user for giving an instruction and a display unit configured to display information to be notified to the user. A network I/F 207 is configured to connect the image processing apparatus 103 to the network 104 and is configured to control transmission of image data acquired by scanning performed by the scanner 205 to a file shared server (not illustrated) on the network. A FAX 210 is configured to transmit and receive image data through a telephone line.

Figure 3:
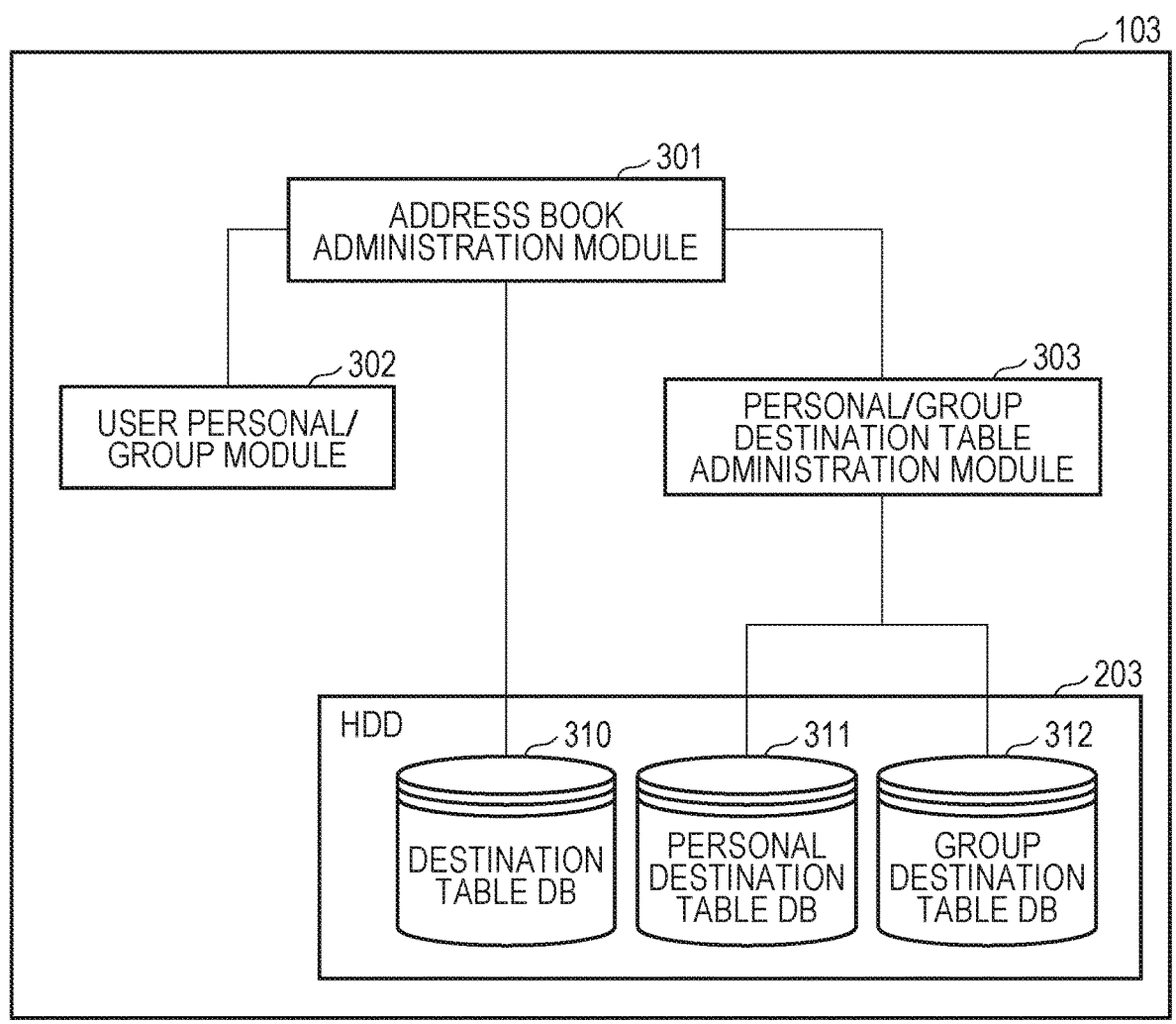
FIG. 3 illustrates an exemplary configuration of an address book related module in the image processing apparatus according to the first embodiment.

FIG. 3 illustrates a configuration example of address book related modules in the image processing apparatus 103 according to the first embodiment. The modules illustrated in FIG. 3 correspond to programs stored in the ROM 209, and the programs may be decompressed into the RAM 208 for execution. The CPU 201 executes the decompressed programs to implement the functions of the modules.

An address book administration module 301 is configured to manage destination table data (including names of destination tables and destination data). Among destination table data managed by the address book administration module 301 is the destination table data which can be accessed by all users, which is saved in a destination table DB (database) 310 in the HDD 203.

A user personal/group module 302 is configured to manage user information (login IDs (or user IDs) and passwords) of users and manage which user is associated with which user group (which will be described with reference to FIG. 6). A personal/group destination table administration module 303 is configured to manage personal destination table data which can be accessed by a user only and group destination table data which can be accessed by users belonging to a certain user group only. Among destination table data (including names of destination tables and destination data) managed by the personal/group destination table administration module 303 is personal destination table data which is saved in the personal destination table DB 311 in the HDD 203. The group destination table data is saved in a group destination table DB 312 in the HDD 203.

The address book administration module 301 is configured to manage personal destination table data and group destination table data through the personal/group destination table administration module 303.

In various embodiments, a plurality of destination tables can be registered with the destination table DBs 310 to 312.

Figure 4:
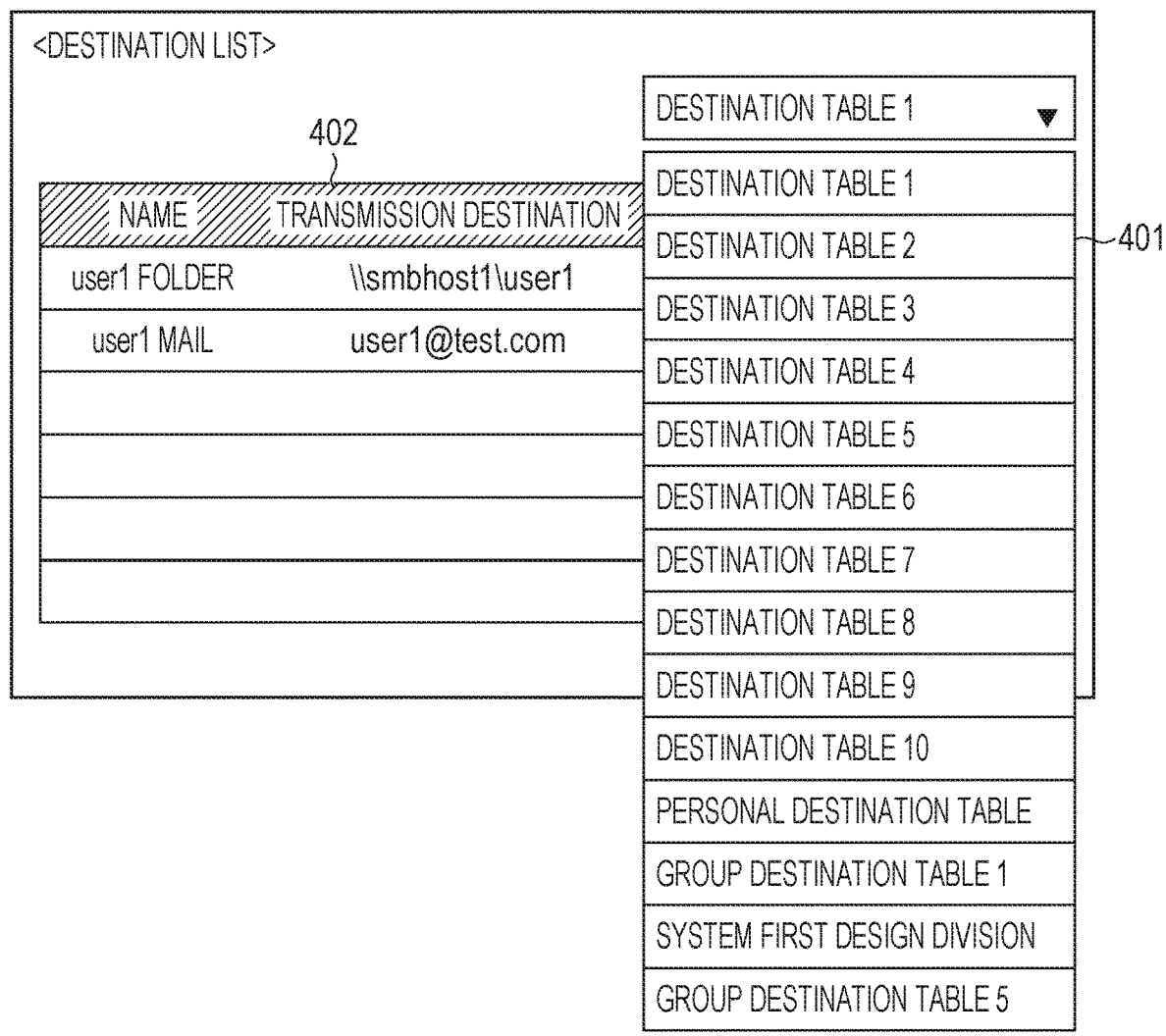
FIG. 4 illustrates a display example of a name list in address books displayed on an operating unit in the image processing apparatus according to the first embodiment.

FIG. 4 illustrates a display example of a name list of destination tables displayed on the operating unit 206 in the image processing apparatus 103 according to the first embodiment. The list 401 displays a list of names of destination tables stored in the destination table DB 310, the personal destination table DB 311, and the group destination table DB 312.

The address book administration module 301 in response to a request to display the name list 401 of destination tables from the operating unit 206 obtains names of destination tables from the destination table DB 310, the personal destination table DB 311 and the group destination table DB 312 in the HDD 203. The obtained name list 401 is displayed on the operating unit 206. The request to display the name list 401 of destination tables from the operating unit 206 can include an instruction to display a name list of destination tables in a specific destination table DB among the destination table DB 310, the personal destination table DB 311, the group destination table DB 312.

The names of destination tables to be registered with the destination table DB 310, the personal destination table DB 311 and the group destination table DB 312 may be arbitrarily set by users. However, in a case where a user does not explicitly set a name, the address book administration module 301 sets a default destination table name. The default destination table name is set by the address book administration module 301 so as not to overlap with names in the destination table DB 310, the personal destination table DB 311 and the group destination table DB 312. For example, "DESTINATION TABLE" may be set as a destination table name in the destination table DB 310, "PERSONAL DESTINATION TABLE" may be set as a destination table name in the personal destination table DB 311, and "GROUP DESTINATION TABLE" may be set as a destination table name in the group destination table DB 312.

Next, a user may select an arbitrary destination table name from the name list 401 of destination tables displayed on the operating unit 206. Thus, the address book administration module 301 obtains destination data from the destination table DB storing the selected destination table and displays it on the destination display unit 402. In the example in FIG. 4, "DESTINATION TABLE 1" is selected from the list 401, and the name (\\smhost\user1) of the destination table and destination data (user1@test.com) are displayed on a destination display region 402. Referring to FIG. 4, the names of group destination tables excluding the name displayed as "SYSTEM FIRST DESIGN DIVISION" are default destination table names.

FIGS. 5A to 5C illustrate management of destination table data in the destination table DB 310, the personal destination table DB 311, and the group destination table DB 312.

FIG. 5A illustrates example destination table data managed in the destination table DB 310. The destination table DB 310 stores a total of ten destination tables, and "1" to "10" are uniquely allocated as destination table IDs 501 of the destination tables. A name 502 of a destination table and destination data 503 are stored in the HDD 203 in association with the corresponding destination table.

FIG. 5B illustrates example destination table data managed in the group destination table DB 312.

Group destination table IDs 504 of "1" to "N" (where N varies dynamically according to the corresponding setting) are uniquely allocated to corresponding group destination tables. A group destination table name 505, an accessible affiliation group 506, and destination data 507 are stored in the HDD 203 in association with the corresponding group destination table. Referring to FIG. 5B, the name having "2" as a group destination table ID 504 is not a default name.

FIG. 5C illustrates example destination data managed in the personal destination table DB 311.

Personal destination table IDs 508 of "1" to "N" (where N varies dynamically according to the corresponding setting) are uniquely allocated to corresponding personal address books. A personal destination table name 509, an accessible affiliation user 510, and destination data 511 are stored in the HDD 203 in association with the corresponding personal address book. Here, no number for uniqueness is given at the end of a default name for the personal destination table name 509. This is because each personal destination table is a destination table owned by a user and is not accessible by other users.

FIG. 5D illustrates example data saved as destination data which may include a destination name and a source host name, for example.

FIG. 6 illustrates an example management table describing which user is associated with which user group according to the first embodiment. The management table is stored in the HDD 203.

A unique group ID 601 is allocated to each user group. Under "USER GROUP" 602, a name of the corresponding user group is given. An affiliation user 603 for user authentication for accessibility is allocated to each user group. For example, "UserA", "UserB", and "UserC" allocated to "GroupA" having "1" as group ID 601 are affiliation users 603 for user authentication for accessibility.

The user personal/group module 302 is configured to search a name of a user received from the address book administration module 301 through the management table and return a list of all user groups to which the user belongs to the address book administration module 301.

Figure 7:
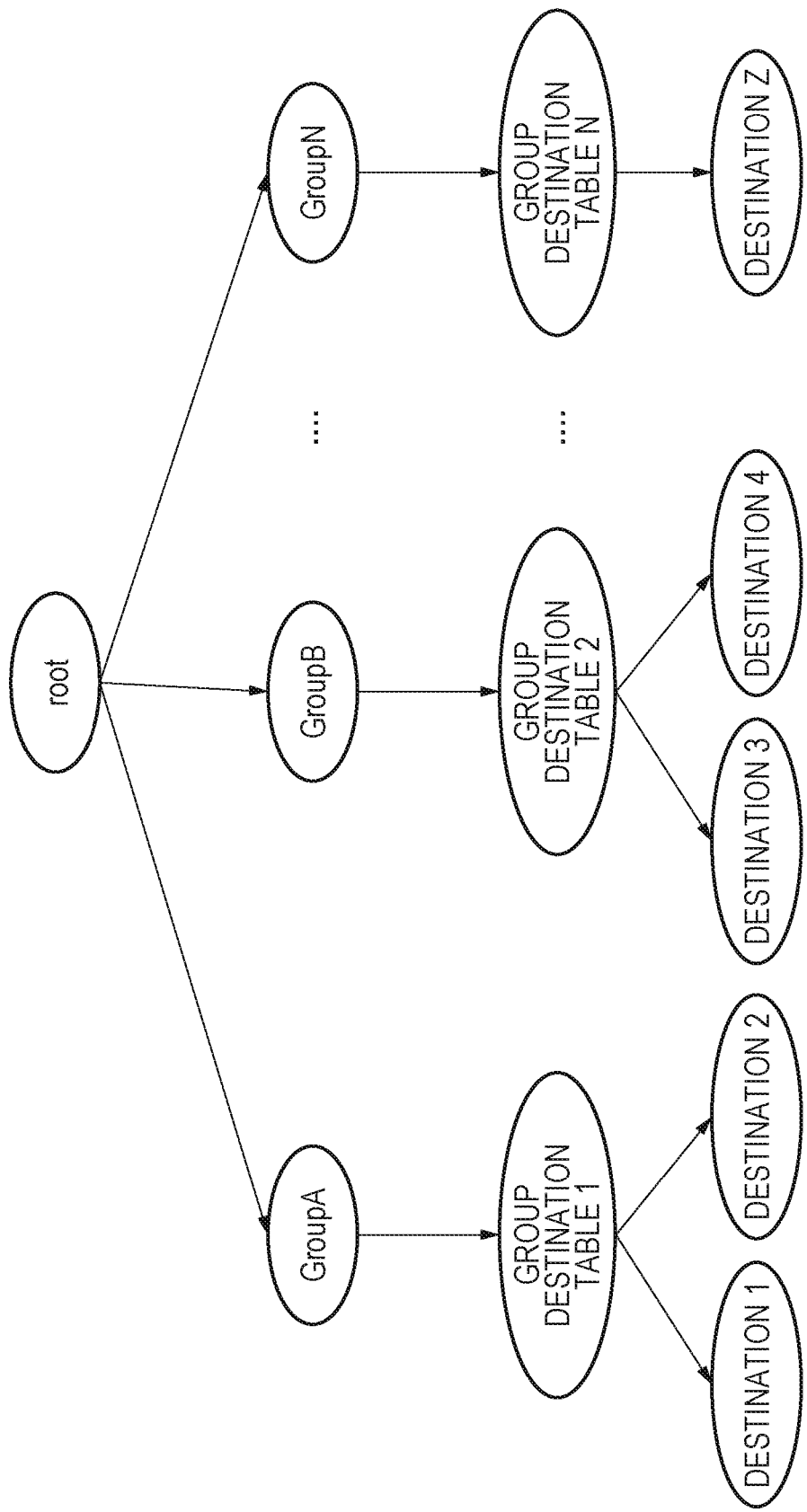
FIG. 7 illustrates a relationship among user groups, group destination tables, and destination data according to the first embodiment.

FIG. 7 illustrates a relationship among user group, group destination table, and destination data according to the first embodiment.

The relationship is managed in a tree structure having a node of each user group (such as GroupA) associated with a destination table of the group thereunder and further having destination data thereunder.

FIG. 8A illustrates an example of data (destination table data for import) acquired by exporting destination table data with "1" as a destination table ID 501 illustrated in FIG. 5A.

A name ("DESTINATION TABLE 1" here) of a destination table is set under "AddressBook Name". If a default destination table name is set, the default destination table name can be directly set under the item. However, if no name is set, it is handled as a default destination table name. The identifier under "AddressBook ID" indicates the type of destination table. Here, "1" under "AddressBook ID" indicates a normal destination table stored in the destination table DB 310.

Figure 8C:
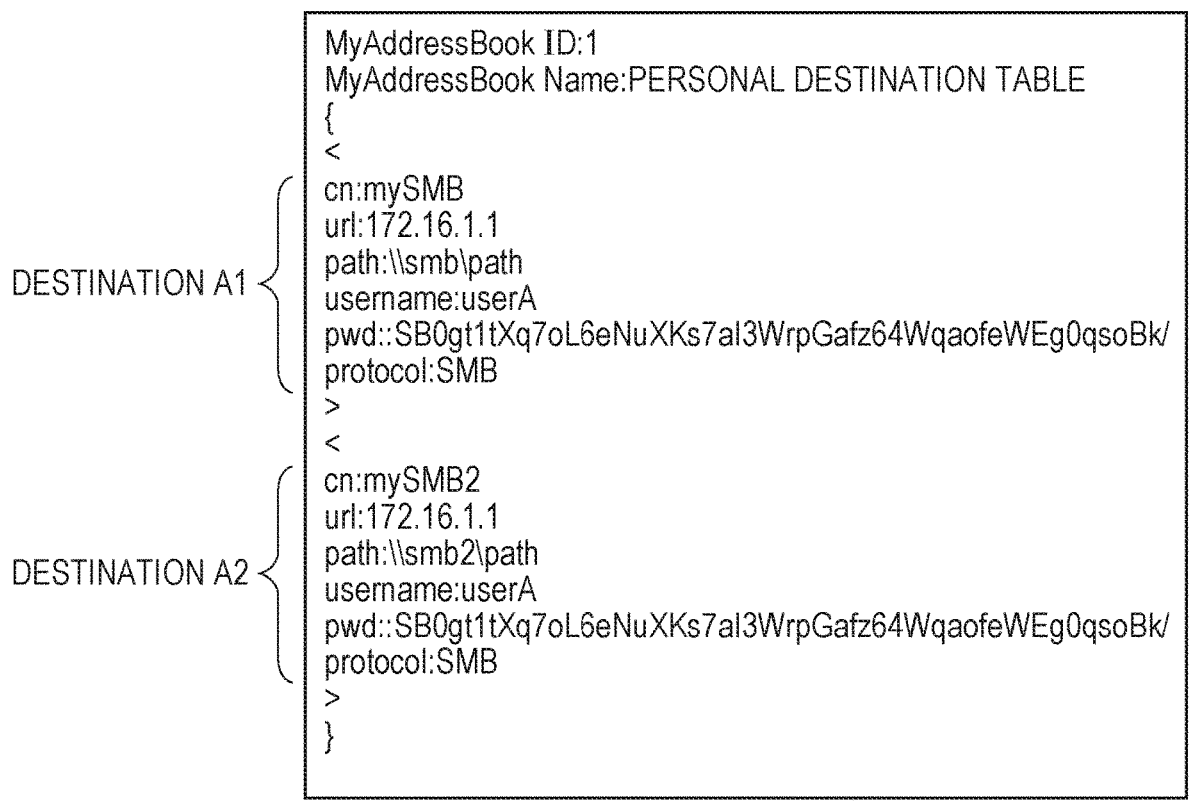

Referring to FIGS. 8A to 8C, data enclosed by "<" and ">" correspond to one destination data set. Destination table data for import in FIG. 8A include three destination data sets (destination 1, destination 2, and destination 3).

FIG. 8B illustrates an example of data (destination table data for import) acquired by exporting destination data of a group destination table having "2" as a destination table ID in FIG. 5B.

A name ("SYSTEM FIRST DESIGN DIVISION" here) of the group destination table is set under "GroupAddressBook Name". If a default destination table name is set here, the default destination table name may directly be set. However, if no name is set there, it is determined as a default destination table name. The identifier for "GroupAddressBook ID" indicates the type of destination table. A type "2" indicates a group destination table stored in the group destination table DB 312 illustrated in FIG. 5B. Referring to FIG. 5B, the destination table data for import include two destination data sets (destination C and destination D).

FIG. 8C illustrates an example of data (destination table data for import) acquired by exporting destination table data of a personal destination table having "1" as a destination table ID in FIG. 5C.

Under "MyAddressBook Name", a name ("PERSONAL DESTINATION TABLE" here) of a destination table in a personal destination table is set. If a default destination table name is set here, the default destination table name may directly be set. However, if no name is set there, it is determined as a default destination table name. The identifier under "MyAddressBook ID" indicates the type of destination table, and "1" indicates a personal destination table stored in the personal destination table DB 311. Referring to FIG. 5C, the destination table data for import include two destination data sets (destination A1 and destination A2).

The destination table data for import illustrated in FIGS. 8A to 8C are stored in a storage device (such as an HDD) in the computer 101.

Figures 9A, 9B:
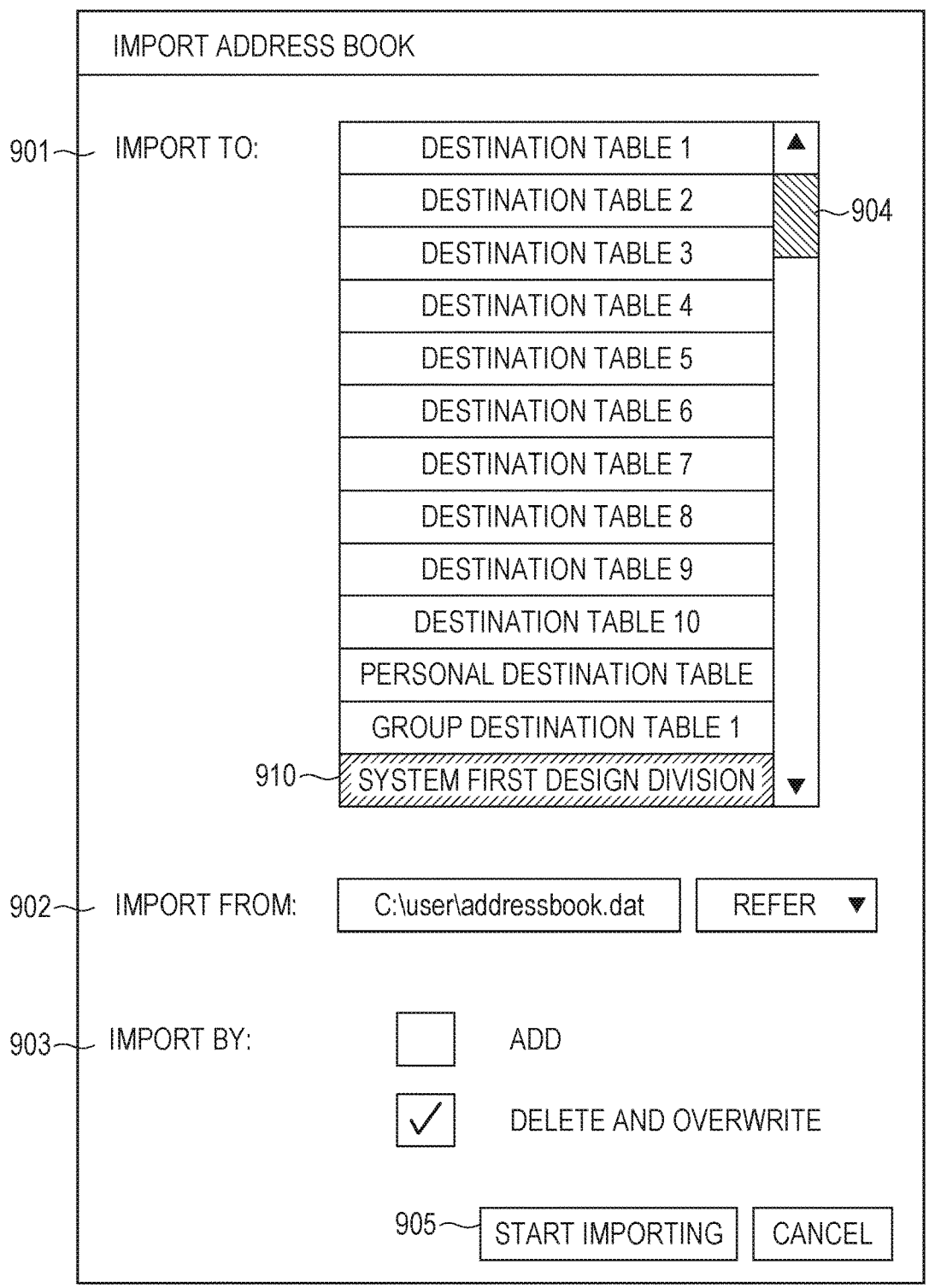
FIG. 9A illustrates an import screen example in a case of import to an image processing apparatus displayed on a web browser in a computer according to the first embodiment.
FIG. 9B illustrates a data structure of destination table data for import.

FIG. 9A illustrates a screen example to be displayed by a web browser of the computer 101 in a case where the destination table data for import in FIGS. 8A to 8C, for example, is to be imported to the image processing apparatus 105 over the network 104.

Destination tables in import destination 901 displays a list of destination table data sets managed in the destination table DB 310, the personal destination table DB 311 and the group destination table DB 312 obtained from the image processing apparatus 105 being an import destination. Here, the destination tables 901 display a list of destination tables in the image processing apparatus 105 to which the destination table data for import illustrated in FIGS. 8A to 8C, for example, is to be imported and are usable for designating a destination table as an import destination. The list may be scrolled with a scroll bar 904 to designate an arbitrary destination table. In the example in FIG. 9A, "SYSTEM FIRST DESIGN DIVISION" 910 is selected as an import destination.

A destination table in import source 902 corresponds to a designated location of the destination table data for import which is exported from the image processing apparatus 103 and is saved in the computer 101. An import method 903 corresponds to a mode selected for importing the destination table data for import illustrated in FIGS. 8A to 8C, for example. If "ADD" is selected, the destination table data in the import destination is kept, and the destination data of the destination table data for import, which is designated at the destination table in import source 902, is imported by adding it to the destination table data in the destination table data in the import destination 901.

On the other hand, if "DELETE AND OVERWRITE" is selected as illustrated in FIG. 9A, all of destination table data designated in the destination tables in the import destination 901 are deleted, and the destination table data for import, which is designated at the destination table in import source 902, is then imported.

When a START IMPORTING button 905 is pressed after the items are set on the screen as illustrated in FIG. 9A, the importing with a data structure illustrated in FIG. 9B is executed to the image processing apparatus 105 over the network 104.

The data structure in FIG. 9B has the items set in FIG. 9A so that the destination table data can be imported to the image processing apparatus 103. Referring to FIG. 9B, "DELETE AND OVERWRITE" as an import method and "AddressBook ID:2" stored in the destination table DB 310 as an import destination are designated.

Figure 10:
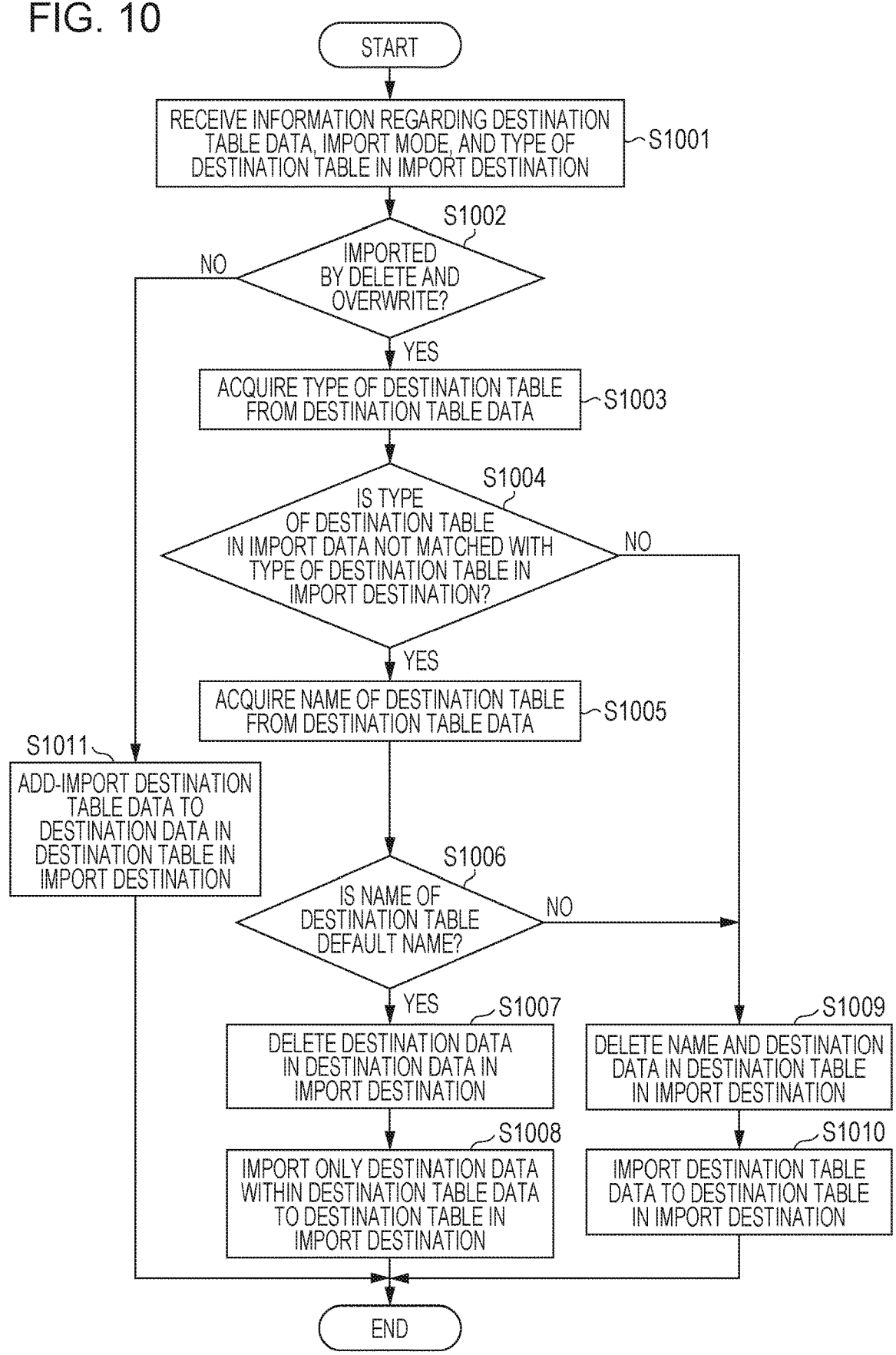
FIG. 10 is a flowchart illustrating import processing to be performed on destination table data in the image processing apparatus according to the first embodiment.

FIG. 10 is a flowchart illustrating destination table data import processing in the image processing apparatus 105 according to the first embodiment. The processing illustrated in the flowchart can be implemented by the CPU 201 executing programs stored in the ROM 209 in the image processing apparatus 105 and decompressed into the RAM 208.

According to the first embodiment, the destination table data for import in FIG. 8A is to be imported to "SYSTEM FIRST DESIGN DIVISION" designated at the destination table in import destination 901. It is assumed here that the destination table data in "SYSTEM FIRST DESIGN DIVISION" in an import destination before the importing is the destination table data illustrated in FIG. 5B, for example.

The processing illustrated in the flowchart is started in response to press of the "START IMPORTING" button 905 on the screen in FIG. 9A and reception of the destination table data for import from computer 101 in the data structure in FIG. 9B.

First, the CPU 201 in S1001 functions as the address book administration module 301 and receives destination table data for import in the data structure illustrated in FIG. 9B and advances the processing to S1002. In S1002, the CPU 201 identifies the import method set at the import method 903. If the import method is "ADD", the processing moves to S1011 where the CPU 201 obtains the destination table in the import destination from the data in FIG. 9B. Destination data is obtained from the destination table data in FIG. 9B for the obtained destination table, and the add import processing is performed on the existing destination table data. Then, the processing ends. If the import destination table is a personal destination table or a group destination table, the import processing is performed through the personal/group destination table administration module 303.

On the other hand, if the CPU 201 in S1002 identifies "DELETE AND OVERWRITE" as the import method, the processing moves to S1003 where the type of destination table is obtained from the destination data in FIG. 9B. The type of destination table can be obtained by obtaining the identifier "AddressBook ID/GroupAddressBook ID/MyAddressBook ID" which is described with reference to FIGS. 8A to 8C. Next, in S1004, the CPU 201 determines whether the type of import source destination table obtained in S1003 is matched with the type of destination table in the import destination in FIG. 9B. If it is determined that they are not matched, the processing moves to S1005 where the name of the destination table is obtained from the destination table data in FIG. 9B. The name of the destination data can be obtained by obtaining the name set in the identifier "AddressBook Name/GroupAddressBook Name/MyAddressBook Name" described with reference to the destination table data in FIGS. 8A to 8C. In S1006, the CPU 201 determines whether the obtained destination table name is a default name or not. It is a default name if it is matched with one of default names for destination tables or if no name is set, as illustrated in FIGS. 8A to 8C. If the CPU 201 in S1006 determines that a default name is set, the processing moves to S1007 where the destination table designated as the import destination in FIG. 9B is obtained, and the destination table data in the import destination is only deleted. In S1008, the CPU 201 obtains only the destination data from the destination table data in FIG. 9B and imports the destination data to the destination table in the import destination. Then, the processing ends.

In "DELETE AND OVERWRITE" mode, if the destination table name in the destination table data for import is a default name, the name of the destination table in the import destination is kept, and the destination data is only overwritten.

FIG. 11 exemplarily illustrates destination table data of "SYSTEM FIRST DESIGN DIVISION" after the import processing in S1008 completes. Like numbers refer to like parts in FIG. 5B and FIG. 11.

The destination data having "2" as a group destination table ID in FIG. 11 keeps the name (SYSTEM FIRST DESIGN DIVISION) of the group destination table before importing as the name 505 of the group destination table. On the other hand, in the destination data 507, the destination data included in the destination table data for import in FIG. 8A is changed from "DESTINATION C, DESTINATION D" in FIG. 5B to "DESTINATION 1, DESTINATION 2, DESTINATION 3".

If the CPU 201 in S1006 determines that no default name is set, the processing moves to S1009 where the import destination table in the data in FIG. 9B is obtained, and the destination table name in the destination table data and destination data in the import destination are deleted. In S1010, the CPU 201 obtains the destination table data in the data in FIG. 9B and imports it to the import destination table. Then, the processing ends.

If it is determined in S1004 that the types of the destination tables are matched, the processing in S1009 and S1010 is executed. Then, the processing ends.

According to the first embodiment, as described above, overlapping of identical default destination table names can be prevented when destination data for import having the default destination table name is imported to a different type of destination table in the delete and overwrite mode.

If the destination table name is a default name or is not set, the name of the destination table in the import destination is saved. Thus, a user can identify the type of destination data from the name of the destination table for improved usability.

Second Embodiment

Figure 12:
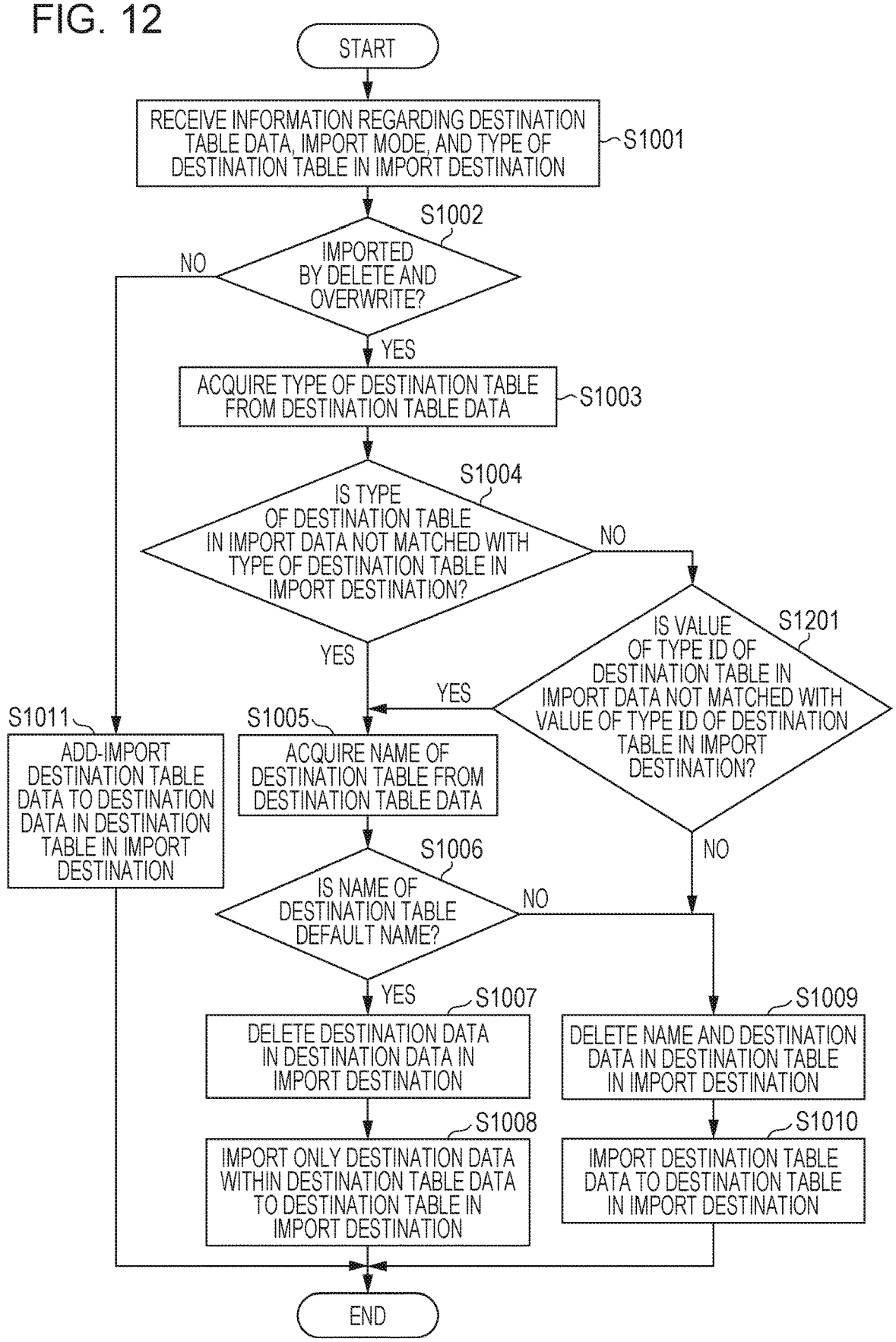
FIG. 12 is a flowchart illustrating import processing to be performed on destination table data in an image processing apparatus according to a second embodiment.

FIG. 12 is a flowchart illustrating import processing on destination table data in the image processing apparatus 105 according to a second embodiment. The processing illustrated in the flowchart can be implemented by execution, by the CPU 201, of programs stored in the ROM 209 and decompressed into the RAM 208. Like numbers refer to like parts in FIG. 10 and FIG. 12, and any repetitive description will be omitted. Because the system configuration and the configurations of the image processing apparatuses 103 and 105 according to the second embodiment are the same as those of the first embodiment, any repetitive description will be omitted.

Because the processing according to the second embodiment is the same as the processing illustrated in FIG. 10 except for processing in S1201 added to the processing in the flowchart illustrated in FIG. 10, differences will only be described.

If it is determined in S1004 that the types of the destination tables are matched, the processing moves to S1201 where the CPU 201 determines whether the ID set for the type of destination table in destination data for import is matched with the ID set for the type of the destination table in the import destination or not.

The ID set for the type of destination table may be a value set for the identifier "AddressBook ID/GroupAddressBook ID/MyAddressBook ID" illustrated in FIGS. 8A to 8C, for example. Referring to FIG. 8A, the AddressBook ID being an identifier of the destination table is "1". The ID is the same as the destination table ID (501, 504, 508) illustrated in FIGS. 5A to 5C. If the CPU 201 in S1201 determines that the value of the ID set for the type of destination table is different, the processing moves to S1005 where, if the name of the destination table in the destination data for import is a default name, the destination data of the import destination address book is only updated. On the other hand, if it is determined in S1201 that the ID set for the type of destination table in the destination data for importing is matched with the ID set for the type of the destination table in the import destination, the processing moves to S1009, and the destination table in the import destination is updated with the destination table data in the destination data for import.

According to the second embodiment, as described above, when the destination data for import having a default destination table name is to be imported in the delete and overwrite mode, a destination table name which is not of a specific type can be prevented from being changed to the default name. This can prevent overlapping setting of an identical default destination table name.

Third Embodiment

According to the first and second embodiments, the destination table name in the import destination is not set when it is determined in S1006 in FIG. 10 and FIG. 12 that a default name is set as the name of the destination table included in the destination table data for import. According to the third embodiment, on the other hand, the name of the destination table in the import destination may be prevented from being deleted at all times without performing the default name determination processing in S1006. In other words, after the processing in S1005, the processing in S1007 and S1008 may be performed at all times. Because the system configuration and the configurations of the image processing apparatuses 103 and 105 according to the third embodiment are the same as those of the first embodiment, any repetitive description will be omitted.

According to the third embodiment, the name of the destination table in the import destination can be kept at all times, which can prevent overlapping setting of an identical default destination table name.

Fourth Embodiment

According to the first to third embodiments, whether the destination table name included in the destination table data for import or the name of the destination table in the import destination is to be used is selected in the import destination image processing apparatus. According to a fourth embodiment on the other hand, the processing in S1006 is replaced by processing for determining whether the name of the destination table included in the destination table data for import is matched with the name of the import destination table or not. If the names of the destination tables are not matched, a confirmation window as illustrated in FIG. 13 may be displayed on the operating unit 206 so that a user can select which destination table name is to be used. Because the system configuration and the configuration of the image processing apparatuses 103 and 105 according to the fourth embodiment are the same as those of the first embodiment, any repetitive description will be omitted.

FIG. 13 illustrates an example of the confirmation window to be displayed on the operating unit 206 in the image forming apparatus 105 according to the fourth embodiment.

Referring to FIG. 13, names of destination tables in an import source and in an import destination are simultaneously displayed for improved usability.

If "NAME OF DESTINATION TABLE IN IMPORT SOURCE" is selected on the screen in FIG. 13, the processing in S1009 and S1010 is performed so that the name of the destination table in the import source can be set as the name of the destination table in the import destination.

If "NAME OF DESTINATION TABLE IN IMPORT DESTINATION" is selected on the screen in FIG. 13, the processing in S1007 and S1008 is performed so that the name of the destination table in the import destination can be kept.

According to the fourth embodiment, a user can select the name of the destination table in the import source or the name of the destination table in the import destination to be kept. Thus, the name of the destination table in the import destination can be set to the destination table name intended by the user.

According to the aforementioned embodiments, the destination table data for import only contain one type of destination table and one destination table name. However, embodiments of the present disclosure are also applicable to a case where there is a plurality of types of destination table and a plurality of destination table names, and a plurality of destination data sets are included for each of them. In other words, in a case where a plurality of types of destination table, the processing in S1003 and S1004 is performed on the plurality of types of destination table. If even one type is different, the processing in and subsequent to S1005 is performed.

The same is true for destination table names, and the processing in S1005 and S1006 is performed on a plurality of destination table names. If even one default name is included therein, the processing in and subsequent to S1007 may be performed.

Other Embodiments

Various embodiments of the present disclosure can be implemented by processing of reading out and executing, by one or more processors in a computer in a system or an apparatus, a program implementing one or more functions according to the aforementioned embodiments which are supplied to the system or the apparatus over a network or through a storage medium. An embodiment of the present disclosure can also be realized by a circuit (such as an ASIC) which implements the one or more function.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-186140 filed Sep. 23, 2016, which is hereby incorporated by reference herein in its entirety.

What is claimed is:

1. A communication apparatus, comprising:
a storage device that stores a plurality of destination tables, wherein the plurality of destination tables includes a first destination table, and each of the plurality of destination tables has an identifier, a name and destination data;
at least one memory storing instructions; and
at least one processor executing the instructions causing the communication apparatus to:
receive an input of an import destination;
receive a second destination table to be imported into the storage device from an external apparatus;
perform, in a case where destination data included in the second destination table is imported while deleting data of the first destination table stored in the storage device and designated as an import destination, a first determination process for determining whether a name of the second destination table is a default name, wherein the default name is not a name set according to a user instruction; and
import the destination data included in the second destination table into the storage device,
wherein, in a case where it is determined that the name of the second destination table is the default name, a name of the first destination table which has been stored in the storage device is used as a name of a destination table of the imported destination data, and
wherein, in a case where the destination data included in the second destination table is imported while being added to data of the first destination table stored in the storage device and designated as an import destination, the first determination process is not performed.

2. The communication apparatus according to claim 1, wherein the instructions further cause the communication apparatus to perform a second determination process for determining whether a type of the second destination table is matched with a type of the first destination table stored in the storage device or not, and
wherein, in a case where it is determined that the type of the second destination table is matched with the type of the first destination table, the name of the second destination table is used as the name of destination table of the imported destination data.

3. The communication apparatus according to claim 1, wherein, in a case where it is determined that the type of the second destination table is not matched with the type of the first destination table, the first determination process is further performed.

4. A method for controlling a communication apparatus including a storage device that stores a plurality of destination tables, wherein the plurality of destination tables includes a first destination table, and each of the plurality of destination tables has an identifier, a name and destination data, comprising:
receiving an input of an import destination;
receiving a second destination table to be imported into the storage device from an external apparatus;
performing, in a case where destination data included in the second destination table is imported while deleting data of the first destination table stored in the storage device and designated as an import destination, a first determination process for determining whether a name of the second destination table is a default name, wherein the default name is not a name set according to a user instruction; and
importing the destination data included in the second destination table into the storage device,
wherein, in a case where it is determined that the name of the second destination table is the default name, a name of the first destination table which has been stored in the storage device is used as a name of the imported destination table, and
wherein, in a case where the destination data included in the second destination table is imported while being added to data of the first destination table stored in the storage device and designated as an import destination, the first determination process is not performed.

5. The method according to claim 4, further comprising performing a second determination process for determining whether a type of the second destination table is matched with a type of the first destination table stored in the storage device or not, and wherein, in a case where it is determined that the type of the second destination table is matched with the type of the first destination table, the name of the second destination table is used as the name of destination table of the imported destination data.

6. The method according to claim 4, wherein, in a case where it is determined that the type of the second destination table is not matched with the type of the first destination table, the first determination process is further performed.

7. The communication apparatus according to claim 1, wherein, in a case where it is determined that the name of the second destination table is not the default name, the name of the second destination table is used as the name of the destination table of the imported destination data.

* * * * *